United States Patent Office 2,714,581
Patented Aug. 2, 1955

2,714,581
LUMINESCENT MATERIAL

Ferdinand Anne Kröger and Willy Hoogenstraaten, Eindhoven, Netherlands, assignors to Hartford National Bank and Trust Company, Hartford, Conn., as trustee No Drawing. Application October 10, 1951, Serial No. 250,798

Claims priority, application Netherlands October 17, 1950

6 Claims. (Cl. 252—301.6)

This invention relates to a luminescent material and to a screen comprising such a luminescent material. In particular, the invention relates to luminescent zinc and zinc beryllium silicates.

One of the commonest known luminescent materials comprises a base of zinc ortho-silicate which may contain definite elements as an activator such as manganese. Furthermore, zinc silicate or zinc silicate in which part of the zinc is replaced in an isomorphous manner by beryllium and which satisfies the ortho-relations can be made to luminescence, even without an activator, by excitation by electrons, ultra-violet or X-ray radiation at wavelengths extending from about 3000 to 5000 Å. A drawback inherent in the latter silicate which luminesces chiefly in the blue portion of the spectrum is its low light output which makes it less serviceable than other blue luminescent substances, such as magnesium tungstate.

It is an object of this invention to provide a luminescent material comprising a base of zinc silicate which has a greater light output than conventional luminescent materials.

A luminescent material according to the invention consists essentially of a fired reaction product of silicon, oxygen and zinc and also at least one of the metals selected from the group consisting of aluminum or gallium.

The zinc in a luminescent material according to the invention may be replaced for not more than 20 mol. percent by the equivalent element beryllium.

The amounts of zinc, beryllium, silicon and oxygen are preferably in the proportion such that the material has the phenakite structure.

The amount of aluminum and gallium is preferably such that per 1000 atoms of zinc and beryllium not less than one and not more than 300 atoms of aluminum and gallium are present.

The properties of a substance according to the invention are substantially similar to those of non-activated corresponding substances without aluminum or gallium, with the exception that the light output is greater. The quantum efficiency on excitation by ultra-violet rays of 2537 Å is about 10% for the last-mentioned known substances and varies from 30 to 60% for material according to the invention. There is consequently a considerable improvement in the light output.

Material according to the invention may be excited by short-wave ultra-violet radiation, by X-rays and by electrons.

Manufacture of a material according to the invention may be effected either in an oxidising or in a reducing atmosphere. The corresponding non-activated compounds without aluminum or gallium intended for excitation by ultra-violet radiation can be produced only in a reducing atmosphere. The following examples illustrate the manner in which the material according to the invention is prepared:

Example I

A mixture of 488 gms. of ZnO, 185 gms. of $SiO_2$ (anhydrous) and 60 cm.³ of a solution of Al or Ga nitrate containing 1 gram molecule per liter was suspended in water and the suspension vaporised to dryness. The dry substance was heated in air for about 2 hours at 400° C. The resulting product was ground and then heated for 2 hours at a temperature between 1000° and 1300° C., preferably at 1200° C. in air or in a reducing gas mixture (for example hydrogen, steam and nitrogen).

Example II

A mixture of 448 gms. of ZnO, 12.5 gms. of BeO, 185 gms. of $SiO_2$ (anhydrous) and 60 cm.³ of a solution of Al and Ga nitrate containing 0.5 gram molecule of each compound per litre was suspended in water and the suspension vaporised to dryness. The dry substance was heated in air for about 2 hours at 400° C. The resulting product was ground and then heated for 2 hours at a temperature between 1000° and 1300° C., preferably at 1200° C. in air or a reducing gas mixture (for example hydrogen and nitrogen).

A luminescent material according to the invention may naturally be used in mixture with other luminescent substances: they may emit their maximum radiation either in the same or in other parts of the spectrum.

While the invention has thus been described with specific applications and specific examples, other modifications thereof will be readily apparent to those skilled in the art without departing from the spirit and scope of the invention as defined in the claims.

What we claim is:

1. A luminescent material consisting essentially of zinc silicate and from one to 300 atoms of aluminum and gallium for each 1000 atoms of zinc incorporated in said silicate.

2. A luminescent material consisting essentially of zinc silicate having a phenakite crystal structure and from one to 300 atoms of aluminum and gallium for each 1000 atoms of zinc incorporated in said silicate.

3. A luminescent material consisting essentially of zinc-beryllium silicate with up to 20 mol percent of beryllium as a replacement for the zinc in the silicate and from one to 300 atoms of aluminum and gallium for each 1000 atoms of zinc and beryllium incorporated in said silicate.

4. A luminescent material consisting essentially of zinc silicate and from one to 300 atoms of aluminum for each 1000 atoms of zinc incorporated in said silicate.

5. A luminescent material consisting essentially of zinc silicate and from one to 300 atoms of gallium for each 1000 atoms of zinc incorporated in said silicate.

6. A phosphor consisting essentially of zinc silicate activated by gallium.

No references cited.